United States Patent
Chen et al.

(10) Patent No.: US 9,377,816 B2
(45) Date of Patent: Jun. 28, 2016

(54) DOCKING DEVICE AND ELECTRONIC SYSTEM THEREWITH

(71) Applicant: Wistron Corporation, New Taipei (TW)

(72) Inventors: Chien-Wei Chen, New Taipei (TW);
Cheng-Hsing Liu, New Taipei (TW);
Chu-Chia Tsai, New Taipei (TW);
Ming-Ju Hsieh, New Taipei (TW);
I-Chun Chen, New Taipei (TW);
Chien-Yuan Lai, New Taipei (TW);
Shih-Hung Lai, New Taipei (TW);
Hsu-Hong Yao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 16 days.

(21) Appl. No.: 14/619,080

(22) Filed: Feb. 11, 2015

(65) Prior Publication Data

US 2015/0378394 A1 Dec. 31, 2015

(30) Foreign Application Priority Data

Jun. 25, 2014 (TW) .............................. 103121948 A

(51) Int. Cl.
*G06F 1/16* (2006.01)
*H01R 13/73* (2006.01)
*H01H 13/7065* (2006.01)

(52) U.S. Cl.
CPC ............ *G06F 1/1632* (2013.01); *G06F 1/1669* (2013.01); *H01H 13/7065* (2013.01); *H01R 13/73* (2013.01)

(58) Field of Classification Search
USPC ............... 312/139, 408, 306; 248/122.1, 126, 248/276.1, 562; 439/729, 819; 455/575.1, 455/575.4; 16/239, 249; 361/679.21, 361/679.43, 679.41, 679.01, 679.4, 679.36, 361/679.54, 679.33, 679.47, 679.23
See application file for complete search history.

(56) References Cited

U.S. PATENT DOCUMENTS 8,111,506 B2    2/2012  Wang
8,358,314 B2 *  1/2013  Dyke ..................... G09G 5/395
                                              345/531

(Continued)

FOREIGN PATENT DOCUMENTS

TW    I359348    3/2012
TW    M439836    10/2012
TW    I442217    6/2014

OTHER PUBLICATIONS

Office action mailed on Aug. 11, 2015 for the Taiwan application No. 103121948, filing date: Jun. 25, 2014, p. 1 line 14, p. 2-4 and p. 5 line 1.

*Primary Examiner* — Hung Duong
(74) *Attorney, Agent, or Firm* — Winston Hsu; Scott Margo

(57) ABSTRACT

A docking device including a casing and an extension supporting mechanism is disclosed. The extension supporting mechanism includes a sliding member, a transmission member, a supporting member and a clamping member. The sliding member is slidably disposed on the casing. The transmission member, the supporting member and the clamping member are pivoted to the casing, respectively. The transmission member is coupled to the sliding member. The supporting member is coupled to the transmission member. The clamping member further abuts against the sliding member and is for sliding the sliding member as rotating, such that the sliding member drives the transmission to rotate. Accordingly, the transmission member is driven to activate the supporting member to stretch an extension portion of the supporting member out of the casing.

22 Claims, 10 Drawing Sheets

(56) References Cited

U.S. PATENT DOCUMENTS

| | | | | |
|---|---|---|---|---|
| 8,923,627 B2 * | 12/2014 | Tan | ........................ | G06K 15/40 382/103 |
| 2007/0296694 A1 * | 12/2007 | Kim | ...................... | G06F 1/1626 345/156 |
| 2013/0322011 A1 | 12/2013 | Yeh | | |
| 2015/0062073 A1 * | 3/2015 | Heikel | .................... | G06F 3/041 345/174 |

* cited by examiner

DOCKING DEVICE AND ELECTRONIC SYSTEM THEREWITH

BACKGROUND OF THE INVENTION

1. Field of the Invention

The present invention relates to a docking device and an electronic system therewith, and more particularly, to a docking device with extensional supporting function and an electronic device therewith.

2. Description of the Prior Art

With development of touch panel industry, a tablet computer with touch panel is implemented in people's daily life. A user can perform a touch control instruction, such as documentation, cursor moving, zooming in/out and so on, on the touch panel of the tablet computer. When the user performs documentation instruction on the tablet computer, an external keyboard is often utilized for facilitating related affairs. The conventional external keyboard has a slot for inserting and clamping the tablet computer therein, so that the tablet computer in use stands on the external keyboard. In such a manner, the user is capable of utilizing the external keyboard to perform the documentation affairs on the tablet computer. However, the tablet computer has a weight itself. When the tablet computer is engaged in the slot and an angle is included between the tablet computer and the external keyboard as being in use, the weight of the tablet computer itself will generate a moment for the external keyboard, resulting in tendency of the tablet computer to turn over relative to the external keyboard. Accordingly, it results in inconvenience of the external keyboard in use.

SUMMARY OF THE INVENTION

The present invention provides a docking device with extensional supporting function for solving above drawbacks.

According to an embodiment of the present invention, a docking device includes a casing and at least one extension supporting mechanism. The at least one extension supporting mechanism includes a sliding member, a transmission member and a supporting member. The sliding member is slidably disposed on the casing, and the sliding member has a first driving portion. The transmission member is pivoted to the casing, and the transmission member has a second driving portion and a third driving portion. The second driving portion moves with the first driving portion, such that the sliding member activates the transmission member to pivot as sliding. The supporting member is disposed on the casing in a movable manner, and the supporting member has a fourth driving portion and an extending portion. The fourth driving portion moves with the third driving portion, such that the transmission member activates the supporting member to move relative to the casing as pivoting. The docking device further includes a clamping member pivoted to the casing and abutting against the sliding member. The clamping member presses the sliding member to slide as rotating, such that the sliding member activates the transmission member to pivot, so as to make the transmission member activate the supporting member to stretch the extension portion out of the casing.

According to another embodiment of the present invention, a first sliding structure is formed on the sliding member, and the at least one extension supporting mechanism further includes a second sliding structure disposed on the casing. The second sliding structure is for slidably cooperating with the first sliding structure.

According to another embodiment of the present invention, the first sliding structure is a sliding slot, and the second sliding structure is a post.

According to another embodiment of the present invention, a first pivot structure is formed on the transmission member, and the at least one extension supporting mechanism further includes a second pivot structure disposed on the casing. The second pivot structure is for pivotally cooperating with the first pivot structure.

According to another embodiment of the present invention, a distance between the third driving portion and the first pivot structure is greater than a distance between the second driving portion and the first pivot structure.

According to another embodiment of the present invention, a third pivot structure is formed on the supporting member, and the at least one extension supporting mechanism further includes a fourth pivot structure disposed on the casing. The fourth pivot structure is for pivotally cooperating with the third pivot structure, such that the supporting member is pivoted to the casing. The transmission member activates the supporting member to rotate when the sliding member activates the sliding member to pivot, so as to rotate the extension portion out of the casing.

According to another embodiment of the present invention, a distance between a geometrical center of the extension portion and the third pivot structure is greater than a distance between the fourth driving portion and the third pivot structure.

According to another embodiment of the present invention, the first pivot structure and the third pivot structure are respectively a pivot hole, and the second pivot structure and the fourth pivot structure are respectively a pivot post.

According to another embodiment of the present invention, the transmission member includes a first transmission component and a second transmission component. The first transmission component couples with the second transmission component. The second driving portion is formed on the first transmission component, and the third driving portion is formed on the second transmission component.

According to another embodiment of the present invention, the clamping member pushes the sliding member to slide in a first direction when the clamping member rotates away from the casing, and the at least one extension supporting mechanism further includes a lever member and at least one resilient member. The lever member is pivoted to the casing. The lever member has an abutting portion and a connecting portion, and the abutting portion abutting against the sliding member. The at least one resilient member is connected to the connecting portion and the casing, and the at least one resilient member is for driving the lever member to rotate, such that the abutting portion activates the sliding member to slide in a second direction opposite to the first direction.

According to another embodiment of the present invention, the sliding member activates the transmission member to pivot when the sliding member slides in the second direction, such that the transmission member activates the supporting member to rotate the extension portion into the casing.

According to another embodiment of the present invention, the third driving portion and the fourth driving portion are respectively a gear tooth structure, and the at least one extension supporting mechanism further includes a driving member connected to the supporting member and the casing. The driving member is for driving the fourth driving portion to engage with the third driving portion, such that the transmission member activates the supporting member to rotate the extension portion into the casing.

According to another embodiment of the present invention, the supporting member further has a fifth driving portion, and the at least one extension supporting mechanism further includes a damping member rotably disposed on the casing. The damping member has a sixth driving portion. The sixth driving portion moves with the fifth driving portion, such that the damping member damping the extension portion to rotate into the casing.

According to another embodiment of the present invention, the fifth driving portion is a protruding tooth structure, and the sixth driving portion is a tooth slot structure.

According to another embodiment of the present invention, a clamping slot is formed on the clamping member. The clamping slot is for clamping an electronic device, and the docking device further includes an input module installed on the casing and for generating an input signal to the electronic device.

According to another embodiment of the present invention, the docking device further includes a connector coupled to the input module and disposed inside the clamping slot. The connector is for coupling with the electronic device when the clamping slot clamps the electronic device.

According to another embodiment of the present invention, the first driving portion is a rack-and-pinion tooth structure, and the second driving portion, the third driving portion and the fourth driving portion are respectively a gear tooth structure.

According to another embodiment of the present invention, an electronic system includes an electronic device and a docking device. The docking device includes a casing and at least one extension supporting mechanism. The electronic device is detachably installed on the casing, and the at least one extension supporting mechanism includes a sliding member, a transmission member and a supporting member. The sliding member is slidably disposed on the casing, and the sliding member has a first driving portion. The transmission member is pivoted to the casing, and the transmission member has a second driving portion and a third driving portion. The second driving portion moves with the first driving portion, such that the sliding member activates the transmission member to pivot as sliding. The supporting member is disposed on the casing in a movable manner, and the supporting member has a fourth driving portion and an extending portion. The fourth driving portion moves with the third driving portion, such that the transmission member activates the supporting member to move relative to the casing as pivoting. The docking device further includes a clamping member pivoted to the casing and abutting against the sliding member, and the clamping member is for clamping the electronic device. The electronic device is capable of activating the clamping member to rotate when the clamping member clamps the electronic device. The clamping member presses the sliding member to slide as rotating, such that the sliding member activates the transmission member to pivot, so as to make the transmission member activate the supporting member to rotate the extension portion out of the casing.

In summary, the present invention utilizes the clamping member for pressing the sliding member when the clamping member rotates away from the casing, such that the sliding member drives the transmission to pivot, so as to make the transmission activate the supporting member to move or rotate. Accordingly, the extension portion of the supporting member can be moved or rotated out of the casing, so as to increase contact surface between the docking device and supporting object, leading to provide the docking device with extra support. In such a manner, the docking device of the present invention is capable of being against the moment resulting from weight of the electronic device, so as to prevent the electronic device as well as the docking device from turning over and further to increase convenience of the electronic device in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments maybe utilized and structural changes maybe made without departing from the scope of the present invention. Also, it is to be understood that the phraseology and terminology used herein is for the purpose of description and should not be regarded as limiting. The use of "including," "comprising," or"having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
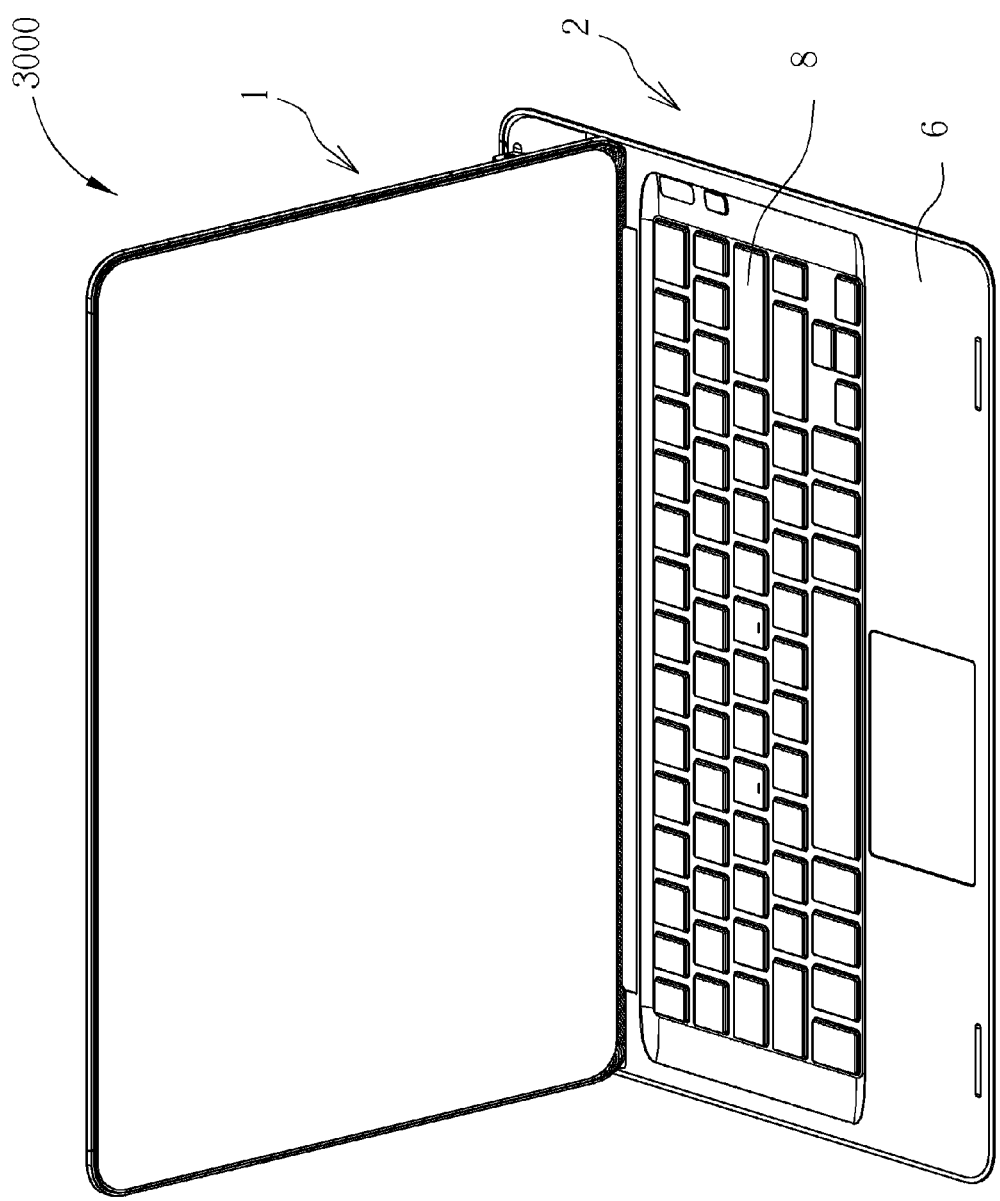
FIG. 1 is a schematic diagram of an electronic system according to an embodiment of the present invention.

Please refer to FIG. 1. FIG. 1 is a schematic diagram of an electronic system 3000 according to an embodiment of the present invention. As shown in FIG. 1, the electronic system 3000 includes an electronic device 1 and a docking device 2. The electronic device 1 is detachably installed on the docking device 2. In this embodiment, the electronic device 1 is a tablet computer, and the docking device 2 is a docking station which is for expanding functions of the tablet computer, such as documentation, connection to peripheral devices and so on. Implementation of the electronic device 1 and the docking device 2 of the present invention is not limited thereto.

Figure 2:
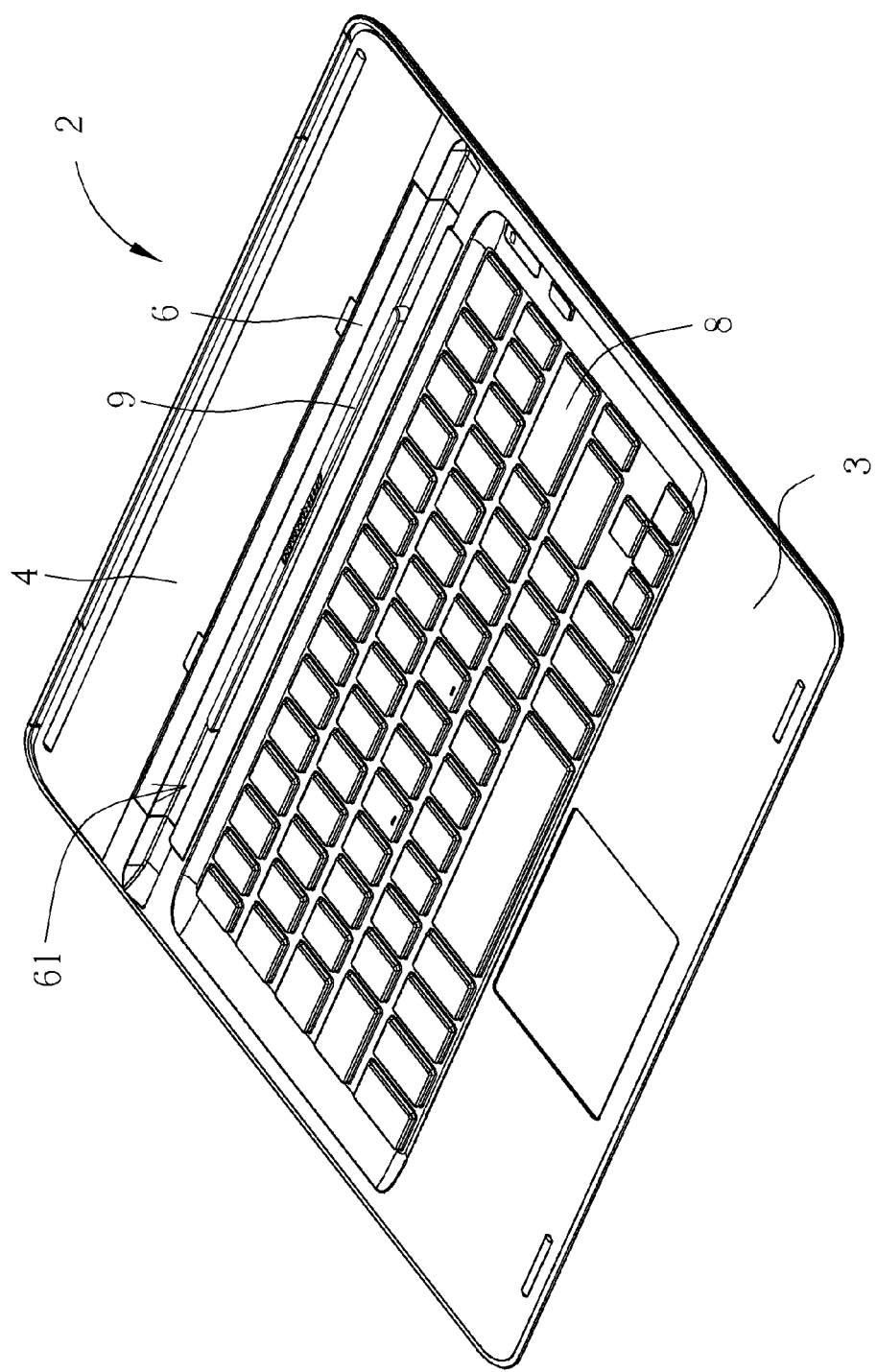
FIG. 2 is a schematic diagram of a docking device according to the embodiment of the present invention.
Figure 3:
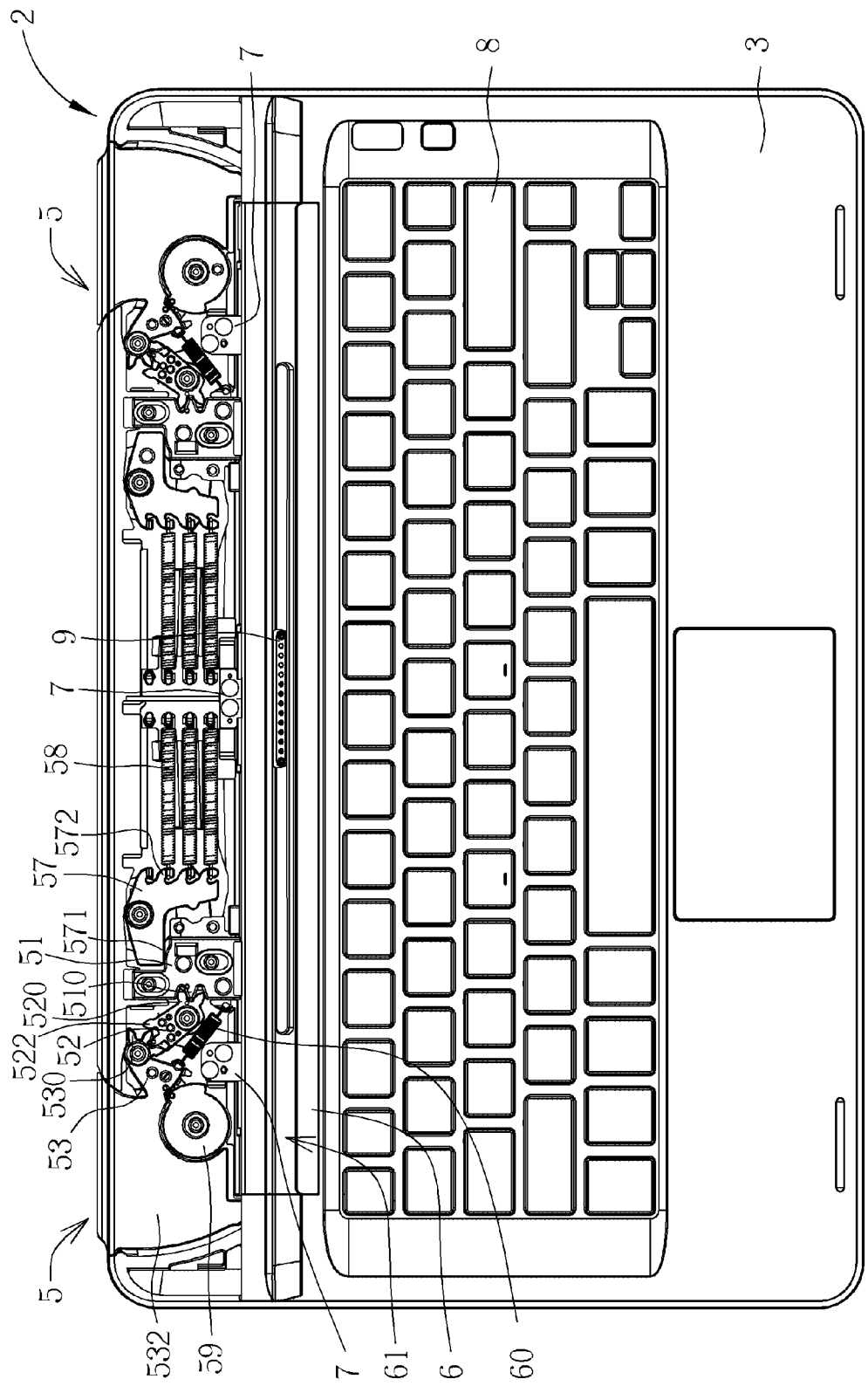
FIG. 3 is an internal diagram of the docking device according to the embodiment of the present invention.
Figure 4:
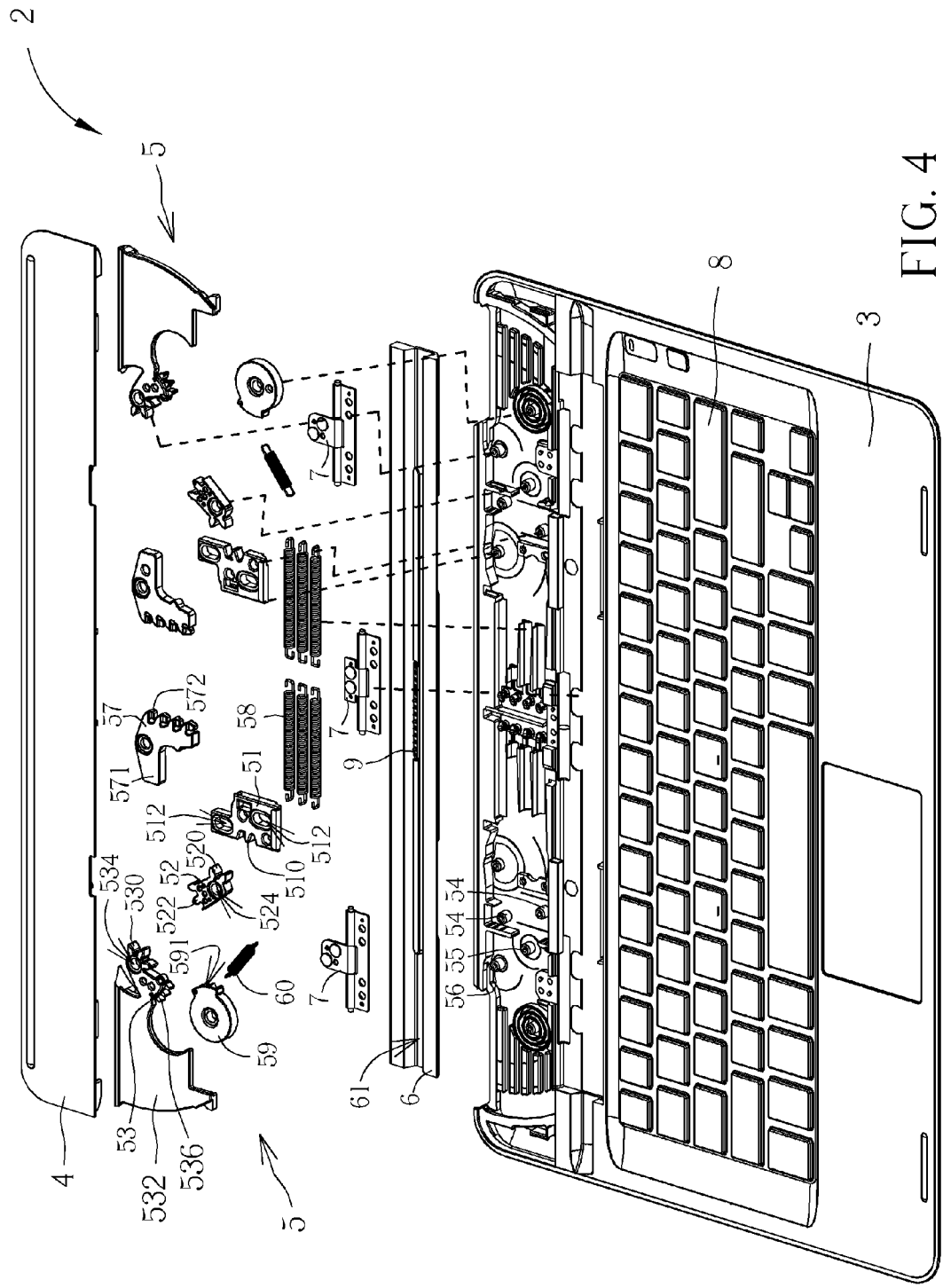
FIG. 4 is an exploded diagram of the docking device according to the embodiment of the present invention.

Please refer to FIG. 2 to FIG. 4. FIG. 2 is a schematic diagram of the docking device 2 according to the embodiment of the present invention. FIG. 3 is an internal diagram of the docking device 2 according to the embodiment of the present invention. FIG. 4 is an exploded diagram of the docking device 2 according to the embodiment of the present invention. As shown in FIG. 2 to FIG. 4, the docking device 2 includes a casing 3, a cap 4, two extension supporting mechanisms 5, a clamping member 6 and three hinge mechanisms 7. The two extension supporting mechanisms 5 are disposed on two corners of the casing 3, respectively, for providing the casing 3 with extra support by structures of pivoting components thereof. An amount and position of the extension supporting mechanism 5 are not limited to those illustrated in figures in this embodiment. For example, the docking device 2 can include only one extension supporting mechanism 5 as well, which is disposed in a central position of the casing 3. Structures of the docking device 2 including at least one extension supporting mechanism 5 are within the scope of the present invention. In addition, the two extension supporting mechanisms 5 of the present invention are symmetric to each other and have same components, and description for structure and working principle of the extension supporting mechanism 5 on one side is provided as follows for simplicity.

Furthermore, the cap 4 and the casing 3 cooperatively cover the extension supporting mechanism 5 for protecting the extension supporting mechanism 5 from damages due to collisions. The clamping member 6 utilizes the three hinge mechanisms 7 for pivoting to the casing 3. Accordingly, the clamping member 6 is capable of rotating relative to the casing 3. An amount and position of the hinge mechanism 7 are not limited to those illustrated in figures in this embodiment. For example, the docking device 2 can include only one hinge mechanism 7 as well. In other words, structures of the docking device 2 including at least one hinge mechanism 7 are within the scope of the present invention. Furthermore, a clamping slot 61 is formed on the clamping member 6, and the clamping slot 61 is for clamping a side of the electronic device 1, such that the electronic device 1 and the docking device 2 are assembled as an assembly status, as shown in FIG. 1.

Figure 5:
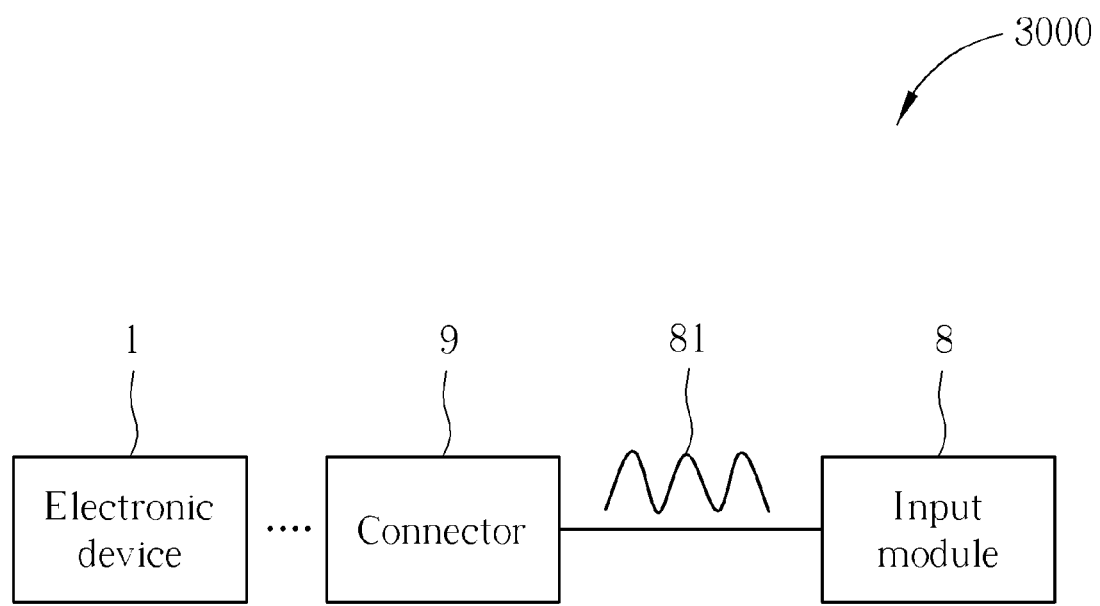
FIG. 5 is a functional block diagram of the electronic system according to the embodiment of the present invention.

Please refer to FIG. 2 to FIG. 5. FIG. 5 is a functional block diagram of the electronic system 3000 according to the embodiment of the present invention. As shown in FIG. 2 to FIG. 5, the docking device 2 further includes an input module 8 and a connector 9. The input module 8 is installed on the casing 3 and for generating an input signal 81 to the electronic device 1. In this embodiment, the input module 8 is a keyboard module, but the present invention is not limited thereto. Furthermore, the connector 9 is coupled to the input module 8 and disposed inside the clamping slot 61. When the clamping slot 61 on the clamping member 6 clamps the side of the electronic device 1, the connector 9 can be used for coupling to the electronic device 1, such that the electronic device 1 communicates with the input module 8. In such a manner, in addition to the electronic device 1 expanding the functions by the docking device 2, the electronic device 1 is utilized for performing documentation affairs by the input module 8 as well. In addition to the docking device 2 utilizing the connector 9 for coupling the input module 8 with the electronic device 1, the docking device 2 can couple the input module 8 with the electronic device 1 in a wireless manner (e.g. Bluetooth). As for which one of the above-mentioned designs is adopted, it depends on practical demands.

As shown in FIG. 2 to FIG. 4, the extension supporting mechanism 5 includes a sliding member 51, a transmission member 52 and a supporting member 53. The sliding member 51 is slidably disposed on the casing 3, and the transmission member 52 and the supporting member 53 are both pivoted to the casing 3. Furthermore, the sliding member 51 has a first driving portion 510, and the transmission member 52 has a second driving portion 520 and a third driving portion 522. The supporting member 53 has a fourth driving portion 530 and an extension portion 532. In this embodiment, the first driving portion 510 is a rack-and-pinion tooth structure, and the second driving portion 520, the third driving portion 522 and the fourth driving portion 530 are respectively a gear tooth structure. Accordingly, the first driving portion 510 (i.e. the rack-and-pinion tooth structure) can engage with the second driving portion 520 (i.e. the gear tooth structure) for making the second driving portion 520 couple with the first driving portion 510, leading the second driving portion 520 to move with the first driving portion 510. The third driving portion 522 (i.e. the gear tooth structure) can engage with the fourth driving portion 530 (i.e. the gear tooth structure) for making the fourth driving portion 530 couple with the third driving portion 522. In such a manner, when the sliding member 51 slides relative to the casing 3, the sliding member 51 activates the transmission member 52 to pivot. When the transmission member 52 is activated by the sliding member 51 to pivot, the transmission member 52 further activates the supporting member 53 to rotate in a direction reverse to a direction that the transmission member 52 pivots. Furthermore, when the supporting member 53 rotates in the direction reverse to the direction that the transmission member 52 pivots, the extension portion 532 of the supporting member 53 can be rotated out of the casing 3, or alternatively, the extension portion 532 can be rotated into the casing 3.

Furthermore, a first sliding structure 512 is formed on the sliding member 51, and the extension supporting mechanism 5 further includes a second sliding structure 54 disposed on the casing 3. The second sliding structure 54 slidably cooperates with the first sliding structure 512, such that the sliding member 51 is disposed on the casing 3 in a slidable manner. In this embodiment, the first sliding structure 512 is a sliding slot, and the second sliding structure 54 is a post. During assembly, the sliding slot sheathes on the post, and then a screw is screwed on the post, so as to prevent the sliding member 51 from separating from the post. In addition, a first pivot structure 524 is formed on the transmission member 52, and the extension supporting mechanism 5 further includes a second pivot structure 55. A third pivot structure 534 is formed on the supporting member 53, and the extension supporting mechanism 5 further includes a fourth pivot structure 56. The second pivot structure 55 and the fourth pivot structure 56 are respectively disposed on the casing 3. The second pivot structure 55 is for pivotally cooperating with the first pivot structure 524, and the fourth pivot structure 56 is for pivotally cooperating with the third pivot structure 534. Accordingly, the transmission member 52 and the supporting member 53 can be disposed on the casing 3 in a rotably manner, respectively.

In this embodiment, the first pivot structure 524 and the third pivot structure 534 are respectively a pivot hole, and the second pivot structure 55 and the fourth pivot structure 56 are respectively a pivot post. During assembly, the pivot holes respectively sheathes on the pivot posts, and the screws are screwed onto the pivot posts, so as to prevent the transmission member 52 and the supporting member 53 from separating from the pivot posts. It should be noticed that a distance between the third driving portion 522 and the first pivot structure 524 is greater than a distance between the second driving portion 520 and the first pivot structure 524 of the transmission member 52, and a distance between a geometrical center of the extension portion 532 and the third pivot structure 534 is greater than a distance between the fourth driving portion 530 and the third pivot structure 534 of the supporting member 53.

As mentioned above, when the transmission member 52 pivots relative to the casing 3, a rotational radius of the third driving portion 522 is greater than a rotational radius of the second driving portion 520. As a result, movement of the third driving portion 522 as the transmission member 52 pivots is greater than movement of the second driving portion 520, i.e. by structural design that the distance between the third driving portion 522 and the first pivot structure 524 is greater than the distance between the second driving portion 520 and the first pivot structure 524, the transmission member 52 can magnify the movement of the third driving portion 522. Similarly, when the transmission member 52 pivots relative to the casing 3, a rotational radius of the extension portion 532 is greater than a rotational radius of the fourth driving portion 530. As a result, movement of the extension portion 532 as the supporting member 53 rotates is greater than movement of the fourth driving portion 530, i.e. by structural design that the distance between the geometrical center of the extension portion 532 and the third pivot structure 534 is greater than the distance between the fourth driving portion 530 and the third pivot structure 534, the supporting member 53 can magnify the movement of the extension portion 532.

In summary, when the sliding member 51 slides to activate rotation of the transmission member 52 and the supporting member 53, the extension portion 532 of the supporting member 53 is capable of rotating out or into the casing 3 by larger movement due to movement magnification of the transmission member 52 and the supporting member 53. In other words, by structural designs that the distance between the third driving portion 522 and the first pivot structure 524 is greater than the distance between the second driving portion 520 and the first pivot structure 524 of the transmission member 52 and that the distance between the geometrical center of the extension portion 532 and the third pivot structure 534 is greater than the distance between the fourth driving portion 530 and the third pivot structure 534 of the supporting member 53, the sliding member 51 is capable of magnifying the movement of the extension portion 532 of the supporting member 53 twice within limited sliding movement, such that the extension portion 532 is able to rotate out of the casing 3 by a larger distance, so as to increase contact area between the extension portion 532 and the supporting object and to result in better support.

Figure 6:
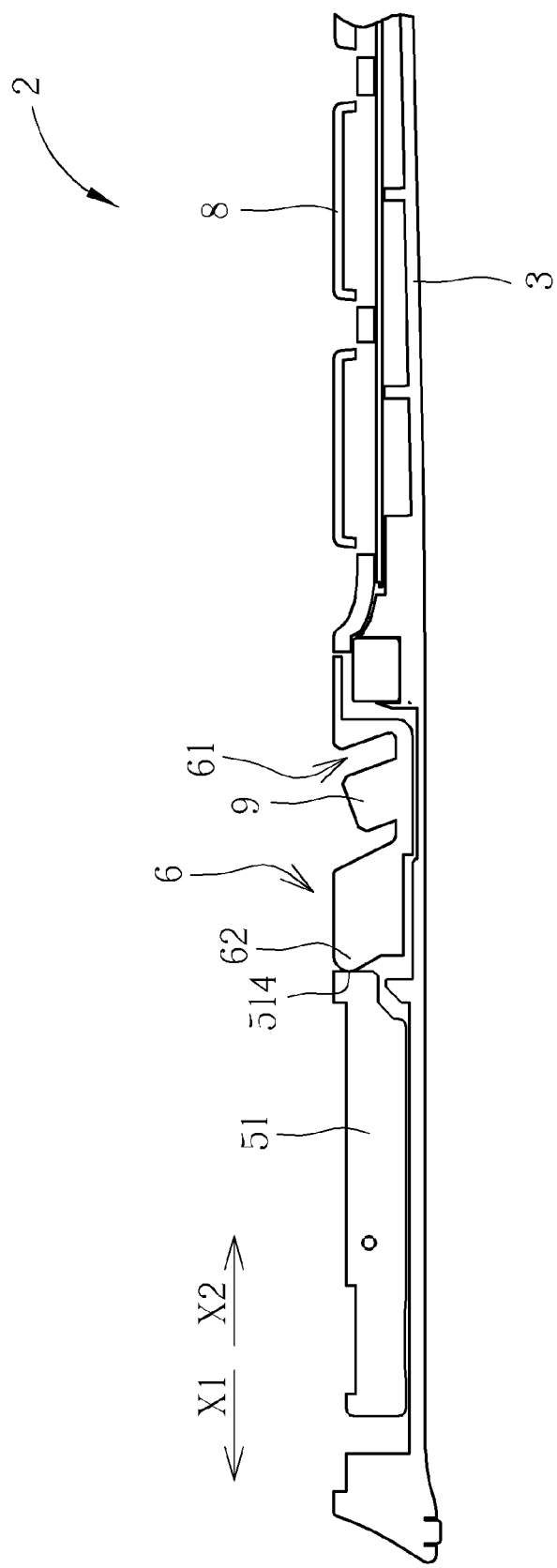
FIG. 6 is a partly sectional diagram of the docking device in a contained status according to the embodiment of the present invention.
Figure 7:
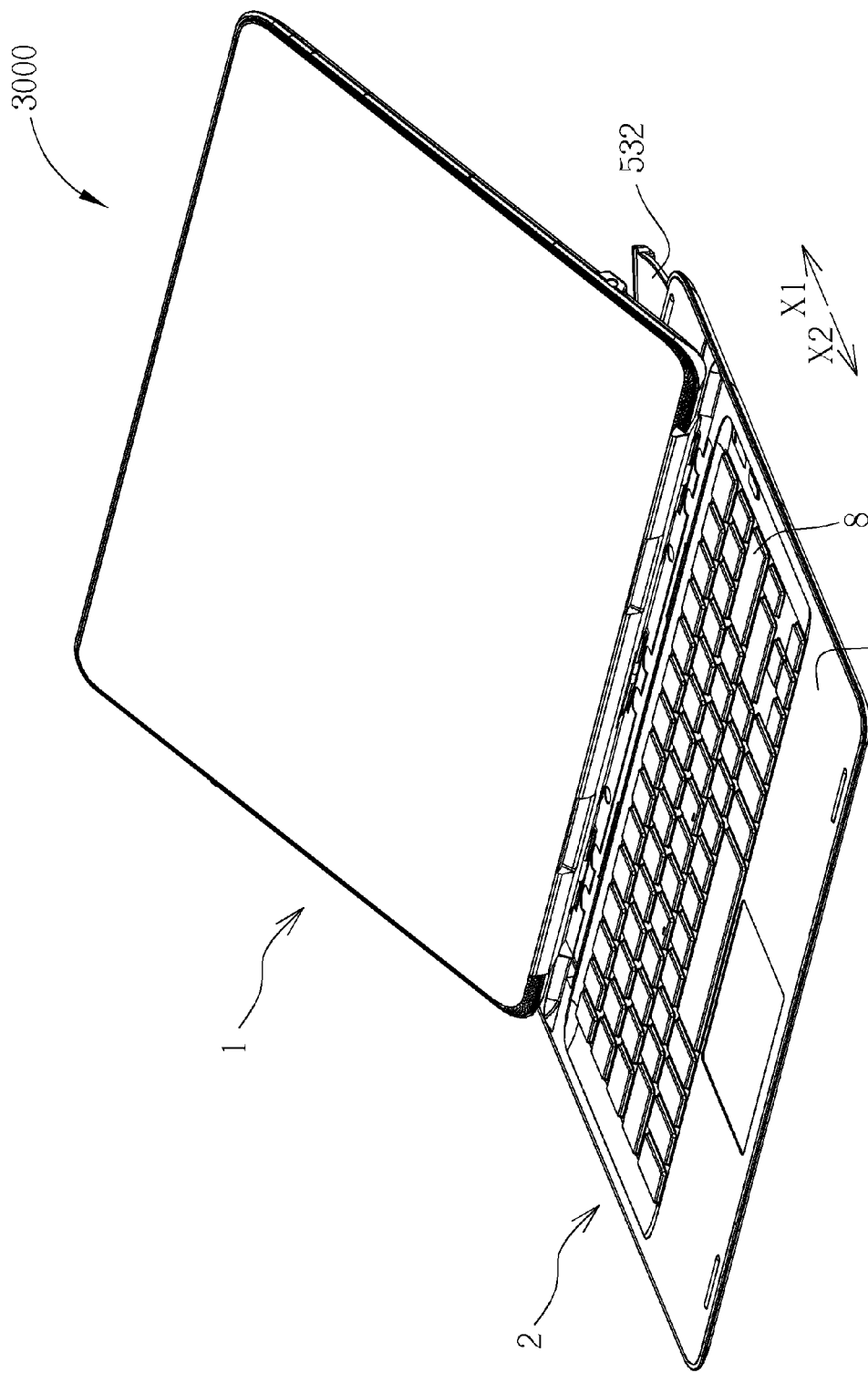
FIG. 7 is a diagram of the electronic system in another using status according to the embodiment of the present invention.
Figure 8:
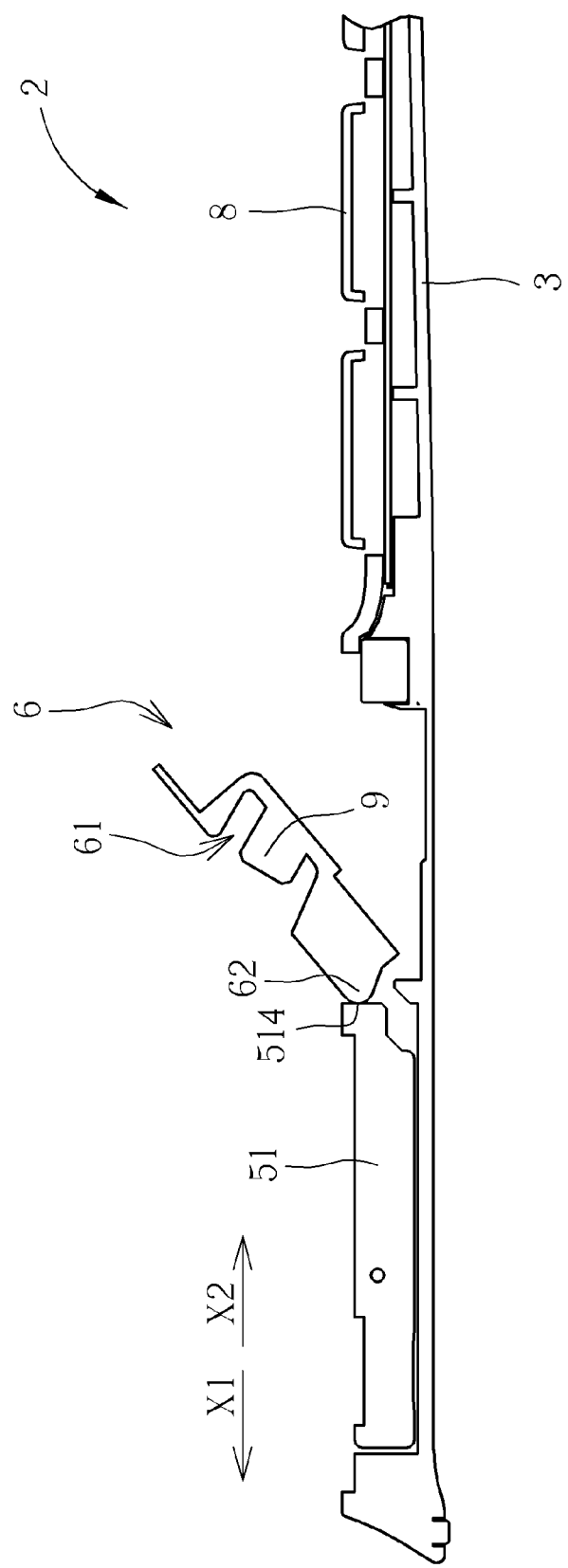
FIG. 8 is a partly sectional diagram of the docking device in FIG. 7.

Please refer to FIG. 6 to FIG. 8. FIG. 6 is a partly sectional diagram of the docking device 2 in a contained status according to the embodiment of the present invention. FIG. 7 is a diagram of the electronic system 3000 in another using status according to the embodiment of the present invention. FIG. 8 is a partly sectional diagram of the docking device 2 in FIG. 7. As shown in FIG. 6 to FIG. 8, the clamping member 6 can have a pushing portion 62 abutting against a lateral wall 514 of the sliding member 51, as shown in FIG. 6. When the clamping member 6 of the docking device 2 clamps the electronic device 1 and when the electronic device 1 is located in a using position shown in FIG. 7, the clamping member 6 is driven by the electronic device 1 to rotate away from the casing 3 from a contained position shown in FIG. 6 to a separating position shown in FIG. 8. Meanwhile, the pushing portion 62 of the clamping member 6 pushes the lateral wall 514 of the sliding member 51, such that the sliding member 51 slides in a first direction X1 away from the input module 8.

Figure 9:
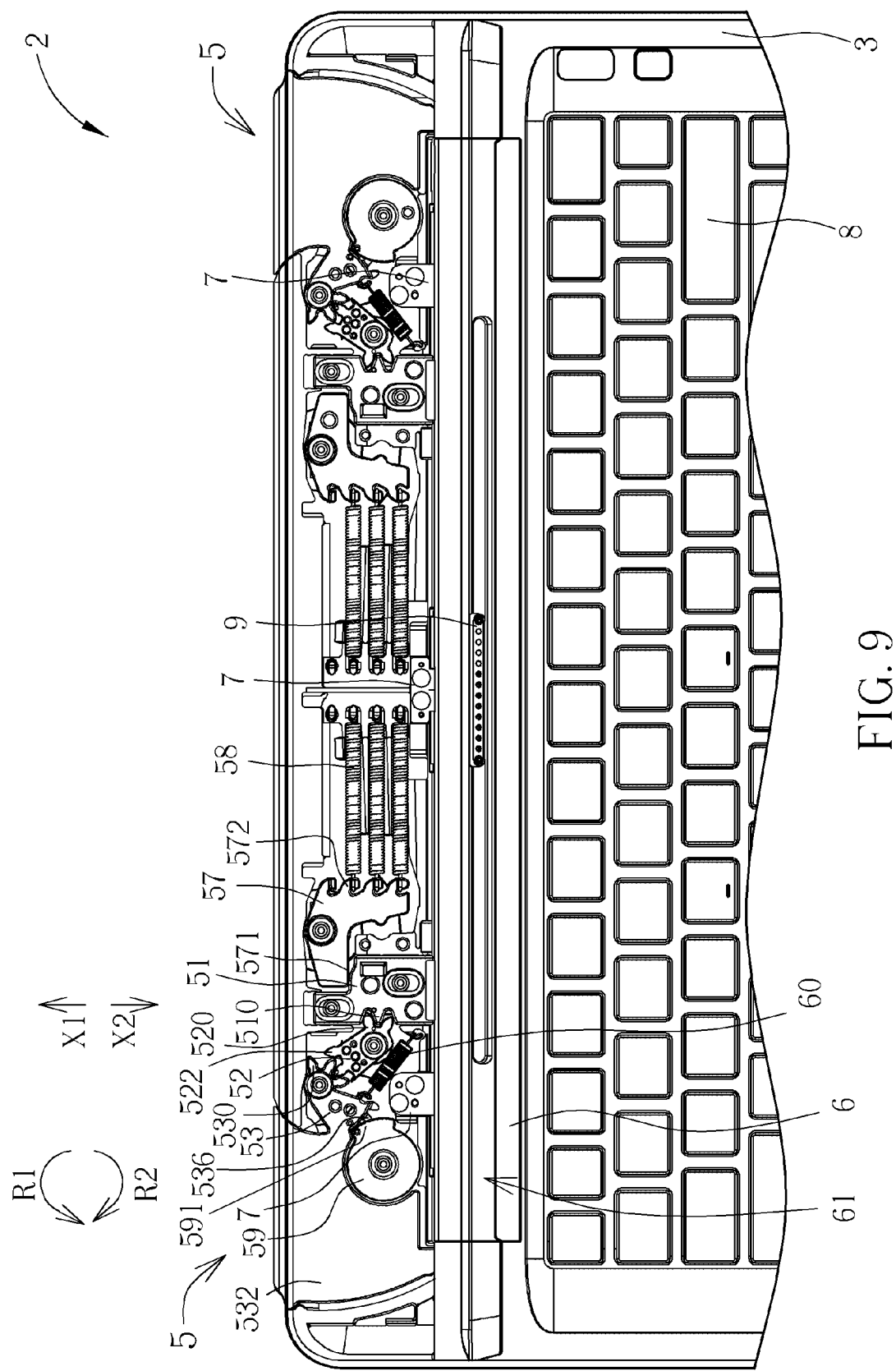
FIG. 9 is a partly internal diagram of the docking device in the contained status according to the embodiment of the present invention.
Figure 10:
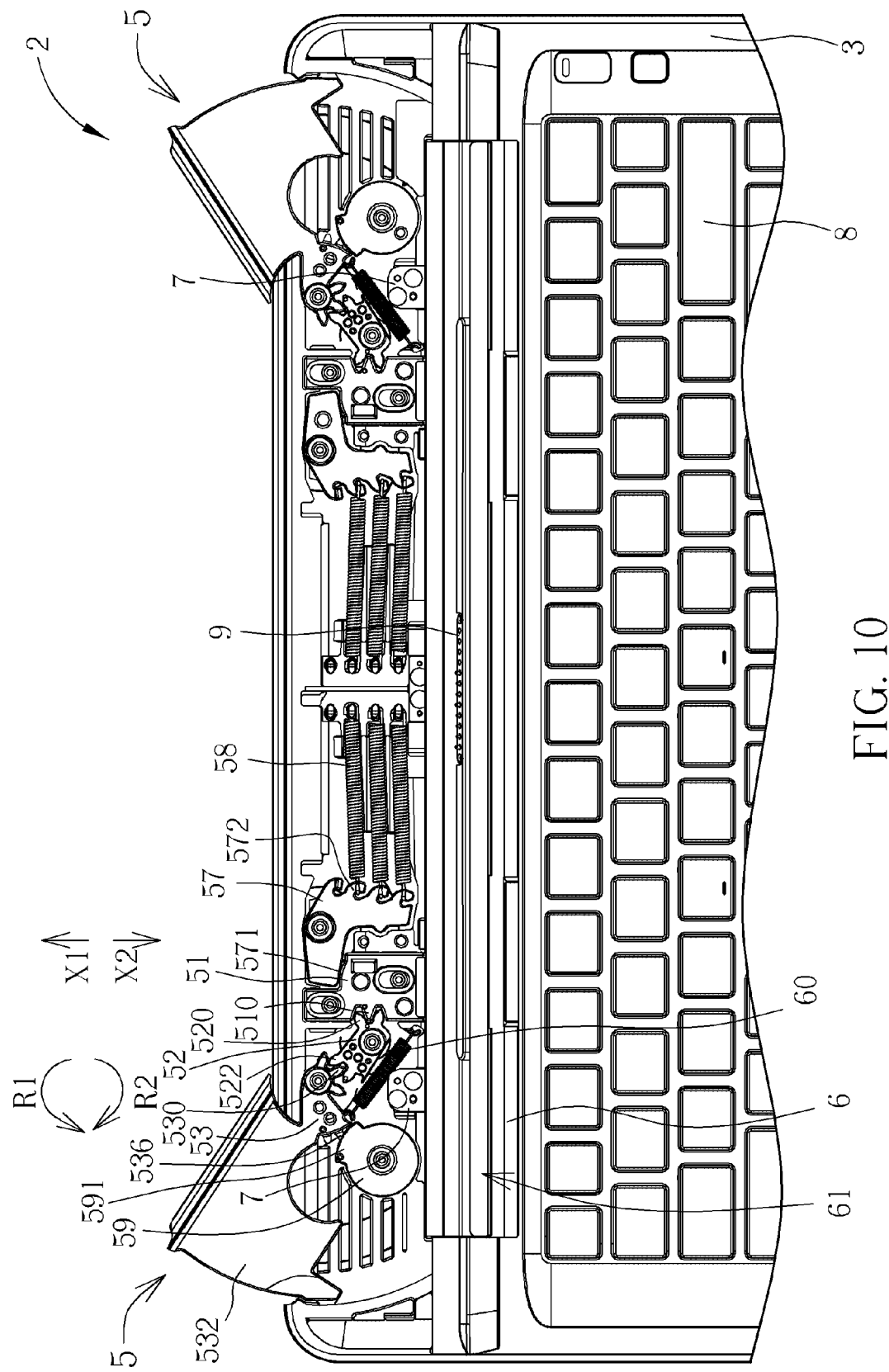
FIG. 10 is a partly internal diagram of the docking device as a clamping member is located in the separating position according to the embodiment of the present invention.

Please refer to FIG. 9 and FIG. 10. FIG. 9 is a partly internal diagram of the docking device 2 in the contained status according to the embodiment of the present invention. FIG. 10 is a partly internal diagram of the docking device 2 as the clamping member 6 is located in the separating position according to the embodiment of the present invention. As shown in FIG. 9 and FIG. 10, when the clamping member 6 rotates from the contained position to the separating position, the clamping member 6 pushes the sliding member 51 to slide in the first direction X1. When the sliding member 51 slides in the first direction X1, the first driving portion 510 couples with and moves with the second driving portion 520, so as to activate the transmission member 52 to pivot in a first rotating direction R1 (i.e. the counterclockwise direction). When the transmission member 52 pivots in the first rotating direction R1, the third driving portion 522 couples with and moves with the fourth driving portion 530, so as to activate the supporting member 53 to pivot in a second rotating direction R2 (i.e. the clockwise direction) reverse to the first rotating direction R1. In such a manner, when the sliding member 51 slides in the first direction X1 from a position shown in FIG. 9 to a position shown in FIG. 10, the extension portion 532 of the supporting member 53 rotates from the position shown in FIG. 9 to the position shown in FIG. 10, so as to rotate the extension portion 532 out of the casing 3. Accordingly, a supporting point of the docking device 2 moves backwards for ensuring to support the electronic device 1 stably.

Furthermore, the extension supporting mechanism 5 further includes a lever member 57 and three resilient members 58. The lever member 57 is pivoted to the casing 3. The lever member 57 has an abutting portion 571 and a connecting portion 572. The abutting portion 571 abuts against the sliding member 51. The resilient member 58 is connected to the connecting portion 572 of the lever member 57 and the casing 3. An amount of the resilient members 58 is not limited to those illustrated in figures in this embodiment. For example, the extension supporting mechanism 5 can include only one resilient member 58 as well, i.e. structures of the extension supporting mechanism 5 including at least one resilient member 58 are within the scope of the present invention. When the sliding member 51 slides relative to the casing 3 in the first direction X1, the sliding member 51 further pushes the lever member 57 to rotate relative to the casing 3 in the second rotating direction R2. When the sliding member 51 slides in the first direction X1 from the position shown in FIG. 9 to the position shown in FIG. 10, the lever member 57 is rotated in the second rotating direction R2 from the position shown in FIG. 9 to the position shown in FIG. 10. Meanwhile, the resilient members 58 are in stretched statuses.

Furthermore, when the applied force forcing the clamping member 6 to be in the separating position disappears, e.g. when the electronic device 1 is detached from the using status shown in FIG. 7, the resilient members 58 are released the resilient potential energy from the stretched statuses for generating a resilient force, so as to drive the lever member 57 to rotate relative to the casing 3 in the first rotating direction R1. During process of the lever member 57 rotating in the first rotating direction R1, the abutting portion 571 of the lever member 57 pushes the sliding member 51 to move in a second direction X2 opposite to the first direction X1. When the sliding member 51 slides in the second direction X2, the first driving portion 510 moves with the second driving portion 520 for activating the transmission member 52 to pivot in the second rotating direction R2. When the transmission member 52 pivots in the second rotating direction R2, the third driving portion 522 moves with the fourth driving portion 530 for activating the supporting member 53 to pivot in the first rotating direction R1. In such a manner, when the sliding member 51 slides in the second direction X2 from the position shown in FIG. 10 to the position shown in FIG. 9, the extension portion 532 of the supporting member 53 is rotated from the position shown in FIG. 10 to the position shown in FIG. 9, such that the extension portion 532 is rotated into the casing 3, so as to contain the extension portion 532 inside the casing 3.

As shown in FIG. 9 and FIG. 10, the supporting member 53 further has a fifth driving portion 536, and the extension supporting mechanism 5 further includes a damping member 59 rotably disposed on the casing 3. The damping member 59 has a sixth driving portion 591, which is for coupling with the fifth driving portion 536. In this embodiment, the fifth driving portion 536 is a protruding tooth structure, and the sixth driving portion 591 is a tooth slot structure. Accordingly, when the supporting member 53 rotates in the first rotating direction R1, the protruding tooth structure (i.e. the fifth driving portion 536) of the supporting member 53 is embedded into the tooth slot structure (i.e. the sixth driving portion 591) of the damping member 59, such that the supporting member 53 activates the damping member 59 to rotate in the second rotating direction R2 when the supporting member 53 rotates in the first rotating direction R1.

In this embodiment, the damping member 59 and the casing 3 are smeared with damping grease for providing a hydraulic pressure when the damping member 59 rotates relative to the casing 3, so as to brake the rotation between the damping member 59 and the casing 3. In such a manner, the damping member 59 decelerates rotation speed of the supporting member 53 in the first rotating direction R1, so as to damp the extension portion 532 of the supporting member 53 to rotate into the casing 3. As a result, it prevents the supporting member 53 from hitting the casing 3 rapidly during the supporting member 53 rotates into the casing 3.

It should be noticed that the extension supporting mechanism 5 of the present invention can further include a driving member 60 connected to the supporting member 53 and the casing 3. Since the third driving portion 522 of the transmission member 52 and the fourth driving portion 530 of the supporting member 53 are respectively a gear tooth structure, it leads to a gap therebetween during engagement and rotation. Thus, the driving member 60 can be used for driving the fourth driving portion 530 to engage with the third driving portion 522, so as to eliminate the gap between the third driving portion 522 and the fourth driving portion 530 during engagement and rotation, such that the transmission member 52 stably activates the supporting member 53 to rotate, so as to rotate the extension portion 532 into the casing 3.

When the electronic device 1 is in the using status in FIG. 7, the moment that the weight of the electronic device 1 generates about the hinge mechanism 7, the torque of the hinge mechanism 7, the moment that the resilient members 58 generate about the lever member 57 and the moment that the driving member 60 generates about the supporting member 53 are in an equilibrium status, so as to make the electronic device 1 be held in the position shown in FIG. 7 stably. In other words, the torque of the hinge mechanism 7, the resilient force of the resilient members 58 and the resilient force of the driving member 60 of the present invention can be designed for instantly stopping the electronic device 1 at any angle relative to the docking device 2.

In addition, structures of the transmission member 52 of the present invention are not limited to those illustrated in figures in this embodiment. For example, the transmission member 52 can be a gear transmission including a first transmission component (i.e. the first gear) and a second transmission component (i.e. the second gear). The first transmission component engages with the second transmission component. The second driving portion is formed on the first transmission component, and the third driving portion is formed on the second transmission component. Furthermore, in design of the aforesaid gear transmission, the fourth driving portion 530 of the supporting member 53 can be a rack-and-pinion tooth structure, correspondingly. The supporting member 53 is disposed on the casing 3 in a movably manner. Accordingly, when the transmission member 52 (i.e. the gear transmission) rotates relative to the casing 3, the transmission member 52 is capable of activating the supporting member 53 linearly, so as to rotate the supporting member 53 out of the casing 3.

Compared to the prior art, the present invention utilizes the clamping member for pressing the sliding member when the clamping member rotates away from the casing, such that the sliding member drives the transmission to pivot, so as to make the transmission activate the supporting member to move or rotate. Accordingly, the extension portion of the supporting member can be moved or rotated out of the casing, so as to increase contact surface between the docking device and supporting object, leading to provide the docking device with extra support. In such a manner, the docking device of the present invention is capable of being against the moment resulting from weight of the electronic device, so as to prevent the electronic device as well as the docking device from turning over and further to increase convenience of the electronic device in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A docking device, comprising:
   a casing;
   at least one extension supporting mechanism, comprising:
      a sliding member slidably disposed on the casing, the sliding member having a first driving portion;
      a transmission member pivoted to the casing, the transmission member having a second driving portion and a third driving portion, the second driving portion moving with the first driving portion, such that the sliding member activates the transmission member to pivot as sliding; and
      a supporting member disposed on the casing in a movable manner, the supporting member having a fourth driving portion and an extending portion, the fourth driving portion moving with the third driving portion, such that the transmission member activates the supporting member to move relative to the casing as pivoting; and
   a clamping member pivoted to the casing and abutting against the sliding member, the clamping member pressing the sliding member to slide as rotating, such that the sliding member activates the transmission member to pivot, so as to make the transmission member activate the supporting member to stretch the extension portion out of the casing.

2. The docking device of claim 1, wherein a first sliding structure is formed on the sliding member, and the at least one extension supporting mechanism further comprises:
a second sliding structure disposed on the casing, the second sliding structure being for slidably cooperating with the first sliding structure.

3. The docking device of claim 2, wherein the first sliding structure is a sliding slot, and the second sliding structure is a post.

4. The docking device of claim 1, wherein a first pivot structure is formed on the transmission member, and the at least one extension supporting mechanism further comprises:
a second pivot structure disposed on the casing, the second pivot structure being for pivotally cooperating with the first pivot structure.

5. The docking device of claim 4, wherein a distance between the third driving portion and the first pivot structure is greater than a distance between the second driving portion and the first pivot structure.

6. The docking device of claim 4, wherein a third pivot structure is formed on the supporting member, and the at least one extension supporting mechanism further comprises:
a fourth pivot structure disposed on the casing, the fourth pivot structure being for pivotally cooperating with the third pivot structure, such that the supporting member is pivoted to the casing, the transmission member activating the supporting member to rotate when the sliding member activates the sliding member to pivot, so as to rotate the extension portion out of the casing.

7. The docking device of claim 6, wherein a distance between a geometrical center of the extension portion and the third pivot structure is greater than a distance between the fourth driving portion and the third pivot structure.

8. The docking device of claim 6, wherein the first pivot structure and the third pivot structure are respectively a pivot hole, and the second pivot structure and the fourth pivot structure are respectively a pivot post.

9. The docking device of claim 1, wherein the transmission member comprises a first transmission component and a second transmission component, the first transmission component couples with the second transmission component, the second driving portion is formed on the first transmission component, and the third driving portion is formed on the second transmission component.

10. The docking device of claim 1, wherein the clamping member pushes the sliding member to slide in a first direction when the clamping member rotates away from the casing, and the at least one extension supporting mechanism further comprises:
a lever member pivoted to the casing, the lever member having an abutting portion and a connecting portion, the abutting portion abutting against the sliding member; and
at least one resilient member connected to the connecting portion and the casing, the at least one resilient member being for driving the lever member to rotate, such that the abutting portion activates the sliding member to slide in a second direction opposite to the first direction.

11. The docking device of claim 10, wherein the sliding member activates the transmission member to pivot when the sliding member slides in the second direction, such that the transmission member activates the supporting member to rotate the extension portion into the casing.

12. The docking device of claim 11, wherein the third driving portion and the fourth driving portion are respectively a gear tooth structure, and the at least one extension supporting mechanism further comprises:
a driving member connected to the supporting member and the casing, the driving member being for driving the fourth driving portion to engage with the third driving portion, such that the transmission member activates the supporting member to rotate the extension portion into the casing.

13. The docking device of claim 1, wherein the supporting member further has a fifth driving portion, and the at least one extension supporting mechanism further comprises:
a damping member rotably disposed on the casing, the damping member having a sixth driving portion, the sixth driving portion moving with the fifth driving portion, such that the damping member damping the extension portion to rotate into the casing.

14. The docking device of claim 13, wherein the fifth driving portion is a protruding tooth structure, and the sixth driving portion is a tooth slot structure.

15. The docking device of claim 1, wherein a clamping slot is formed on the clamping member, the clamping slot is for clamping an electronic device, and the docking device further comprises:
an input module installed on the casing and for generating an input signal to the electronic device.

16. The docking device of claim 1, further comprising:
a connector coupled to the input module and disposed inside the clamping slot, the connector being for coupling with the electronic device when the clamping slot clamps the electronic device.

17. The docking device of claim 1, wherein the first driving portion is a rack-and-pinion tooth structure, and the second driving portion, the third driving portion and the fourth driving portion are respectively a gear tooth structure.

18. An electronic system, comprising:
an electronic device; and
a docking device, comprising:
a casing whereon the electronic device is detachably installed;
at least one extension supporting mechanism, comprising:
a sliding member slidably disposed on the casing, the sliding member having a first driving portion;
a transmission member pivoted to the casing, the transmission member having a second driving portion and a third driving portion, the second driving portion moving with the first driving portion, such that the sliding member activates the transmission member to pivot as sliding; and
a supporting member disposed on the casing in a movable manner, the supporting member having a fourth driving portion and an extending portion, the fourth driving portion moving with the third driving portion, such that the transmission member activates the supporting member to move relative the casing as pivoting; and
a clamping member pivoted to the casing and abutting against the sliding member, the clamping member being for clamping the electronic device, the electronic device being capable of activating the clamping member to rotate when the clamping member clamps the electronic device, the clamping member pressing the sliding member to slide as rotating, such that the sliding member activates the transmission member to pivot, so as to make the transmission member activate the supporting member to rotate the extension portion out of the casing.

19. The electronic system of claim 18, wherein the clamping member pushes the sliding member to slide in a first direction when the clamping member rotates away from the casing, and the at least one extension supporting mechanism further comprises:

a lever member pivoted to the casing, the lever member having an abutting portion and a connecting portion, the abutting portion abutting against the sliding member; and at least one resilient member connected to the connecting portion and the casing, the at least one resilient member being for driving the lever member to rotate, such that the abutting portion activates the sliding member to slide in a second direction opposite to the first direction, wherein the sliding member activates the transmission member to pivot when the sliding member slides in the second direction, such that the transmission member activates the supporting member to rotate the extension portion into the casing.

20. The electronic system of claim 19, wherein the third driving portion and the fourth driving portion are respectively a gear tooth structure, and the at least one extension supporting mechanism further comprises:

a driving member connected to the supporting member and the casing, the driving member being for driving the fourth driving portion to engage with the third driving portion, such that the transmission member activates the supporting member to rotate the extension portion into the casing.

21. The electronic system of claim 18, wherein the supporting member further has a fifth driving portion, and the at least one extension supporting mechanism further comprises:

a damping member rotably disposed on the casing, the damping member having a sixth driving portion, the sixth driving portion moving with the fifth driving portion, such that the damping member damping the extension portion to rotate into the casing.

22. The electronic system of claim 18, wherein a first pivot structure is formed on the transmission member, the at least one extension supporting mechanism further comprises a second pivot structure disposed on the casing, the second pivot structure is for pivotally cooperating with the first pivot structure, a third pivot structure is formed on the supporting member, the at least one extension supporting mechanism further comprises a fourth pivot structure disposed on the casing, the fourth pivot structure is for pivotally cooperating with the third pivot structure, such that the supporting member is pivoted to the casing, wherein the transmission member activates the supporting member to rotate when the sliding member activates the transmission member to pivot for rotating the extension portion out of the casing.

\* \* \* \* \*